April 25, 1961   H. G. WARREN   2,981,482
WATER SPRINKLER
Filed Dec. 16, 1955   2 Sheets-Sheet 2
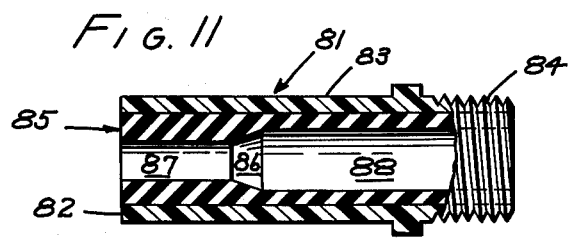
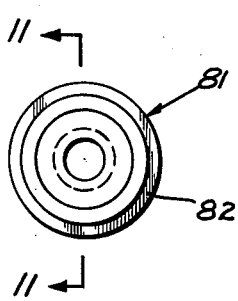 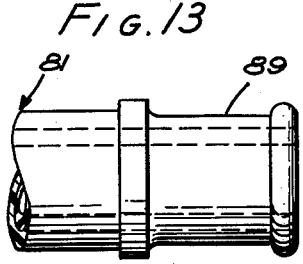
INVENTOR.
HARRY GLENN WARREN
BY
D. Gordon Angus
ATTORNEY.

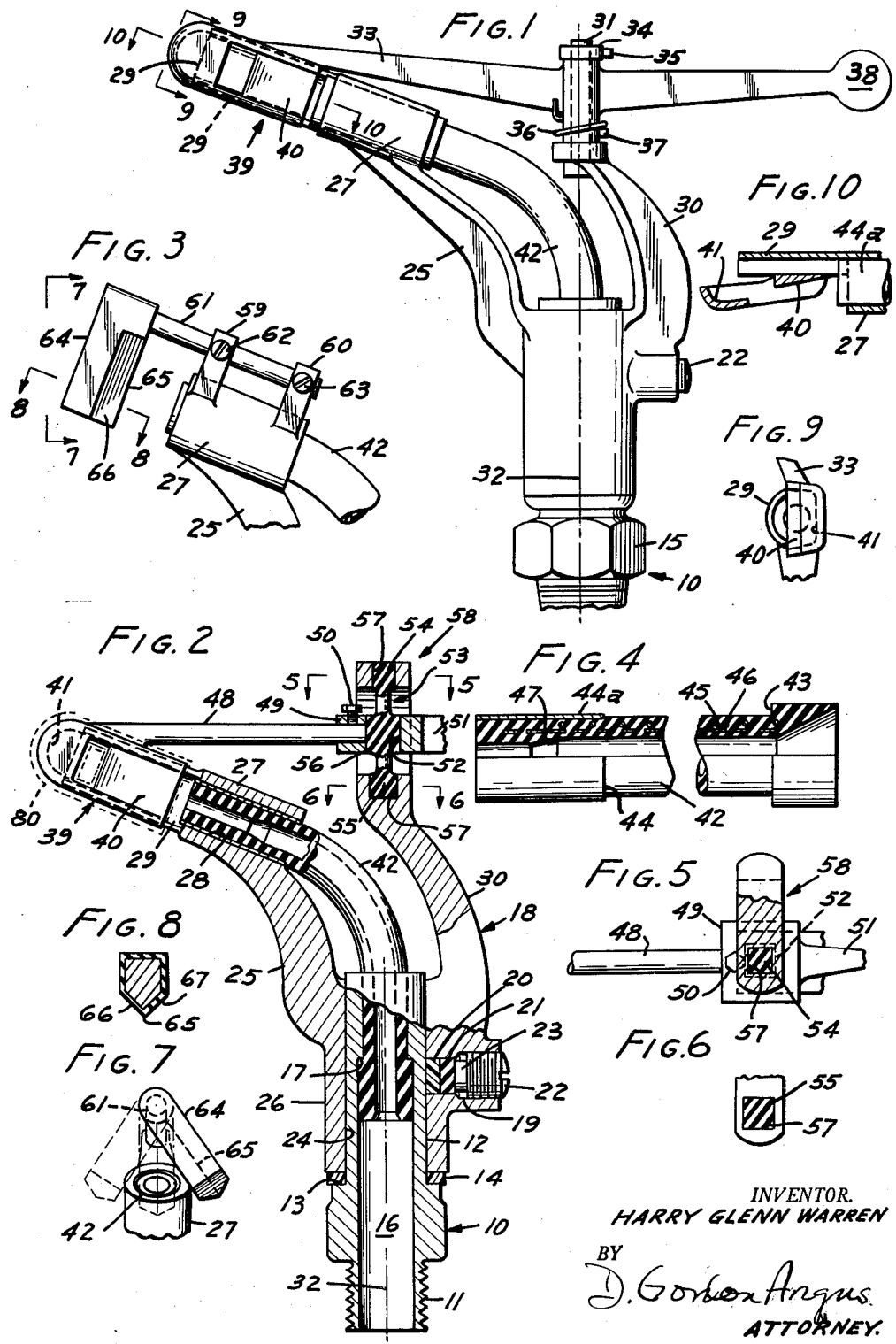

ered Apr. 25, 1961

United States Patent Office

2,981,482

WATER SPRINKLER

Harry Glenn Warren, 711 E. Bennett Ave., Glendora, Calif.

Filed Dec. 16, 1955, Ser. No. 553,637

1 Claim. (Cl. 239—230)

This invention relates to water sprinklers.

The sand, dirt and other grit which is generally found in water used for agricultural purposes is a major cause of wear in water sprinklers. This wear is most critical in rotary type sprinklers, where the grit roughens and abrades the bearing surfaces. Conventional sprinklers are frequently rendered inoperative and leaky after only a short period of use with even moderately gritty water. The magnitude of this problem will be apparent from the fact that most agricultural water which is pumped through sprinklers for distribution on fields, has been obtained from open, unlined ditches, and therefore has a considerable burden of grit. Even domestic water supply for homes is frequently loaded with grit.

An object of this invention is to provide a rotary water sprinkler in which bearing means provided to enable the sprinkler to rotate do not come into contact with the water stream, whereby the grit content of the water distributed by the sprinkler becomes unimportant, inasmuch as it cannot abrade the bearing means.

A related but optional object is to provide a unidirectional impulse-type sprinkler provided with the aforesaid bearing means, and also to provide an integral oscillating member for causing rotation of the sprinkler, which does not require metal springs for its oscillation.

According to this invention, a stationary fitting member has a conduit for passing water therethrough, and is provided with exterior bearing means on which a rotary member turns. The rotary member supports a journal, and a flexible hose is held non-rotatively in the conduit, and is rotatively mounted in the journal. Then when the rotary member is turned, the hose flexes as its end in the journal rotates. In this way, all bearing means are removed from the water flow through the sprinkler, and any grit in the water is unable to affect the bearing means.

A preferred but optional feature of the invention resides in providing the rotary member with an impulse device by which the rotary member is turned, and a brake means to prevent the sprinkler from simply oscillating back and forth through a small arc, as would occur if the impulse member were able to exert the same force-effect in both directions.

Still another optional feature resides in a torsion suspension means for the impulse device, wherein the impulse device is suspended by a distortable torsion element so that when it is forced from a datum position, it will be returned to said position by the torsion element.

Another optional feature of the invention resides in a nozzle orifice within the hose for directing the water stream in a uniform stream.

The above and other features of this invention will be fully understood from the following detailed description and the accompanying drawings, of which:

Fig. 1 is a side elevation of the presently preferred embodiment of a water sprinkler according to this invention;

Fig. 2 is a side elevation, partly in cross section, of the sprinkler of Fig. 1, provided with a modified impulse arm;

Fig. 3 is a fragmentary side view of an optional means for securing rotation of the sprinkler;

Fig. 4 is a side elevation, partly in cross-section, showing a detailed construction of the hose used in the sprinklers of Figs. 1 and 2;

Fig. 5 is a cross-section taken at line 5—5 of Fig. 2;

Fig. 6 is a cross-section taken at line 6—6 of Fig. 2;

Fig. 7 is a side elevation taken at line 7—7 of Fig. 3;

Fig. 8 is a cross-section taken at line 8—8 of Fig. 3;

Fig. 9 is an end view taken at line 9—9 of Fig. 1;

Fig. 10 is a cross-section taken at line 10—10 of Fig. 1;

Fig. 11 is a plan view, partly in cross-section, of an optional type of nozzle for this sprinkler, taken at line 11—11 of Fig. 12;

Fig. 12 is a left hand end view of Fig. 11; and

Fig. 13 shows an optional attachment means for the nozzle of Fig. 11.

Referring now to Figs. 1 and 2, a stationary fitting member 10 is provided with a lower threaded neck 11 for attachment to a water pipe (not shown) or other liquid source.

The upper portion of the fitting is provided with an exterior bearing surface 12. The term "exterior" as used herein relating to bearing surfaces, is intended to mean exterior of any fluid carrying conduit. A shoulder 13 supports a nylon washer 14 at the base of the bearing surface. For convenience in attaching the fitting to a pipe, a hexagonal section 15 may be provided.

A water passage 16 through the fitting has a retainer shoulder 17, so that the passage has a smaller bore at its discharge end than at the intake (threaded) end. It will be apparent that the fitting member may be conveniently turned from hexagonal stock.

A rotary member 18 is provided with a stepped bore 19 in the side thereof, and a brake member comprising a pair of discs 20, 21 is fitted therein, adjacent to the bearing surface 12 on the fitting. The disc 20, being adjacent to the fitting member, is pressed against it to act as friction means against the fitting member. A plug 22 is threaded into the outer end of the bore 19, the plug having a projection 23 thereon which is adapted to press against disc 21, and thereby force disc 20 against the fitting member. This projection can enter the narrow portion of the bore to maintain pressure on the discs as they wear down.

Micarta or nylon have been found satisfactory for the disc 20 which bears against the fitting, and preferably, although not necessarily, disc 21 may be made of a somewhat more compressible material such as rubber in order to keep a force on the fitting even as the disc 20 wears down. The force is regulated by the distance the plug 23 is screwed into the bore.

The rotary member has an internal bearing surface 24 which is in bearing relationship with bearing surface 12 on the fitting. The rotary member can therefore rotate around the fitting member.

A journal arm 25 rises from the base 26 of the rotary member, and has a journal 27 disposed above the base, and obliquely to the passage in the fitting. This journal has an interior bearing surface 28, and a stop 29. The stop may conveniently be an extension of the journal, and restrains the movement of the impulse arm to be described below. The stop also acts as a water guide to keep the stream of water from flowing to the left as seen in Fig. 9, for a significant distance beyond the journal.

A pivot support arm 30 (see Fig. 1) extends upwardly from the base of the rotary member, and supports a pivot pin 31. The pivot pin is located above, and preferably in line with the central axis 32 of the bearing surfaces 12 and 24.

An impulse arm 33 is pivotally mounted to pin 31, and is held to the pin by a collar 34 and set screw 35. A coil spring 36 has one of its ends hooked to the impulse arm. Its other end is fastened by screw 37 to the pivot support arm, so that the left end of the impulse arm is spring-loaded against stop 29. A counterweight 38 balances the impulse arm, and adds to its inertia.

The impulse arm has a deflector 39 on its end and forming a part thereof, which is so disposed and arranged as to strike stop 29 as shown in Fig. 9. The spring 36 normally holds the impulse arm in this position. The deflector has a plate with a face 40 at an angle to the journal, and a cupped deflector face 41 outward of face 40. Deflection of a stream of water by face 40 will cause the water to exert a force on face 41, and move the impulse arm counterclockwise in Fig. 10.

A hose 42 (see Fig. 4) is provided with a shoulder 43 which is intended to bear against shoulder 17 of the fitting member so that the hose is non-rotatively held in the fitting member. The hose is thus in fluid communication with the passage 16, and forms a continuation thereof. At the other end of the member there is provided an external cylindrical bearing member 44 with an exterior bearing surface 44a which is intended to fit in the interior bearing surface 28 of the journal. Internal reinforcement cords and wrappings 45, 46 add flexing strength to the hose and give it a longer life.

A tapered orifice 47 near the discharge end of the hose makes the water issue from the hose in a steady, smooth stream. This orifice is made of and lined with, the material of which the hose is made, that is, rubber.

The impulse arm 48 of the sprinkler of Fig. 2 has a deflector as a part thereof which is similar in all respects to that of Fig. 1. The sole significant difference between the sprinklers of Figs. 1 and 2 resides in the means for pivotally mounting the impulse arm to the pivot support arm 30, and in the means for loading the impulse arm so that the deflector is normally held against the stop 29.

The impulse arm 48 is held to a block 49 by means of a set screw 50. This block is provided with a counterweight arm 51, and has a square-section passage 52 broached therethrough. An elongated resilient torsion member 53, which may be made of rubber, as a single example, has cylindrical portions 53a integral with a pivot block 54, 55 on each end of the member, and an integral mounting block 56 between the pivot blocks. Mounting block 56 is forced into passage 52, and pivot blocks 54, 55 are forced into recesses 57 in a yoke 58 atop the pivot support arm 30. Thus the outer two blocks are held to the rotary member, and the middle block supports the impulse arm and serves to twist the torsion member when the arm is turned. Other forms of torsion members may readily be conceived. It has been found desirable to provide a reduced cross-section between the pivot blocks and the mounting block. However, this is not a limitation on the torsion member.

Fig. 3 illustrates another means for providing rotation of the sprinkler. This embodiment dispenses with the impulse arm, pivot support arm, and stop 29 but retains the rest of the sprinkler structure. It is possible also to do without the brake means, if desired, but the brake means may prove desirable as a means for controlling the speed of rotation.

A pair of spaced bearing blocks 59, 60 are attached to the journal 27, and a shaft 61 is rotatably disposed in these blocks. Set screws 62, 63 are respectively threaded into blocks 59 and 60 and against the shaft to hold the shaft in a predetermined position. A knife-edged deflector 64 is attached to the shaft in the path of the water stream from the hose. The knife edge 65 has two sides 66, 67, and can swing across the water stream so as to divide the stream in any proportion (see Figs. 7 and 8).

As shown in Fig. 2, the deflector on the impulse arm may be given a coat 80 of rubber, or some other abrasion-resistant material. This has been found by experiment to lessen the wear on the tip of the impulse arm. As an alternate construction, the impulse arm tip may be made entirely of rubber, and attached to the impulse arm 33 to become a part thereof.

The inner rubber lining of the orifice results in a marked improvement in the life of the nozzle orifice, inasmuch as the rubber appears to yield slightly and this resists abrasion by sand and grit. The rubber on the interior of the hose, particularly at the orifice, will preferably have a Shore hardness between 60 and 65 on a type A gauge.

Since the orifice portion may have a tendency to wear out faster than the hose, it may be desirable to provide a detachable orifice or nozzle. In Fig. 11 such a nozzle member, or orifice member 81 is shown, in which a cylindrical exterior bearing member 82 has an exterior bearing surface 83 terminated by a shoulder. A threaded neck portion 84 is adapted to be screwed into a hose such as hose 42 of Fig. 4, with this nozzle or orifice portion replacing the orifice 47 and bearing member 44 thereof. A rubber lining 85 within the bearing member has an orifice 86 (shown tapered, although it need not be) between the discharge end 87 and the passage 88 which forms a continuation of the passage within the hose 42.

The exterior bearing member and its exterior bearing surface may be made out of a plastic having good bearing qualities, such as nylon, and Fig. 11 is shaded to show the use of nylon. The Shore hardness of the rubber lining on a type A gauge should read between 60 and 65.

In Fig. 13 there is shown a standard hose connection 89 to replace the threaded neck portion 84 of the nozzle member 81. This hose connection is attached to a hose by simply stretching the hose end over the connection. The remainder of the nozzle member is like that shown in Fig. 11.

The operation of the sprinkler of Fig. 1 will now be described. The neck 11 is first threaded to a source of water such as a hydrant or pipe, and the plug 22 is tightened down to press the disc 20 against the fitting member 10 and act as a brake between the rotary member and the fitting member. The water is then turned on.

As the water issues from the hose, it strikes deflector plate 40. This plate directs some of the water against cupped plate 41, and this reaction throws the deflector out of the path of the water, against spring 36. When the force on the deflector from the stream is absorbed by the spring, the spring will force the deflector back toward the stop 29. During this period, the brake has prevented the rotary member from turning.

However, the spring returns the impulse arm and deflector with considerable force so that the deflector strikes the stop 29 with a hard blow. The force of this blow is augmented by the re-entry of the deflector plate 40 into the water stream, since the tendency of the water stream at the moment of entry is to force the plate toward the stop.

The quick force of the blow from the impulse arm is enough to overcome the static friction force of the brake, and the rotary member is thus turned on the fitting. As soon as the deflector is once more against the stop, the deflector plate directs part of the stream against the cupped plate 41, and the operation is repeated.

While the rotary member is turning on the stationary fitting due to the impulse from the impulse arm, the end of the hose in the fitting member remains stationary. It does not turn, its shoulder 43 simply being firmly seated against shoulder 17 of the fitting.

However, as the journal 27 moves around the axis 32 of the fitting, the bearing surface 44a turns in the bearing surface 28 of the journal. Thus the hose is constantly flexed by virtue of its upper end being twisted and moved around the axis of the fitting, while the lower end remains fixed.

The flexure of the hose has not proved to be a significant problem, since it can be designed for a life of many millions of flexures.

The impulse arm of Fig. 2 is returned to position by the torsion member 53. As the deflector is forced from the water stream, the torsion member is twisted, and when the force imparted to the impulse arm has been absorbed by the torsion member, the deflector is forced back to the stop 29 by the torsion member. Thus the operation of the embodiment of Fig. 2 is the same as that of Fig. 1 except for the means of restoring the impulse arm to its normal position.

The operation of the embodiment of Fig. 3 is continuous instead of by impulse, but the same hose and general sprinkler construction is utilized. The knife edge 65 is placed in the water stream from the hose so as to divert the stream to produce a side force in the desired direction. If the knife edge were centered, there would of course be no rotation. The further off-center, the grater the sideward force. This adjustment will be held by the set screws 62 and 63. The brake may be taken off completely, or, if desired, may be used as an auxiliary speed control.

It will be observed that the only bearing reactions occur between the bearing surfaces of the fitting member and the rotary member, and between the bearing surfaces in the journal and on the discharge end of the hose. Both of these bearing reactions are separated from the water stream, and the water stream never contacts them. Thus, it is immaterial to this sprinkler whether or not there is sand, grit, silt, or any other foreign material in the water being distributed. In fact, mud could be pumped through this sprinkler without any effect on the bearing surfaces. If substances other than water are to be pumped it will be appreciated that the fluid conveying surfaces may be treated to resist any such fluid, while the bearing surfaces may be made of any desired material having good bearing properties, and this latter selection may be made independently of any considerations of the substances being pumped.

If the nozzle member of Figs. 11 or 13 is used, and the orifice wears out before the rest of the flexible hose, it may merely be detached and replaced. The rubber lining of the nozzle member adds greatly to orifice life, however, and replacement is required less frequently than when a common metal orifice is used.

This invention is not to be limited by the embodiments shown in the drawings and described in the description, which are given by way of example and not of limitation, but only in accordance with the scope of the appended claim.

I claim:

A sprinkler, including: a fitting adapted to be fixed by one end to a water supply line, and having a bore therethrough reduced in diameter at the other end of said fitting and forming an internal shoulder; a rotary member journaled on said fitting for rotation about the axis of said fitting bore, and including means defining a bearing bore disposed in obtuse angular relation to said fitting bore and located above and at one side of said fitting, and an impulse arm support spaced from said means; a flexible tube having an expansible head at one end, a nozzle orifice at the other end, and a substantially nonexpansible journal means surrounding said nozzle orifice, said tube being insertable through said fitting bore until said head and shoulder interengage, said head being responsive to water pressure within said tube and fitting bore to expand into fixed sealing engagement with said fitting bore and fix the head end of said tube with respect to said fitting, said journal means being free to rotate in said bearing as said rotary member rotates about said fitting; an impulse arm having reaction means at one end for engagement with a water stream issuing from said nozzle orifice; a mounting device for said impulse arm including anchor elements secured to the impulse arm support of said rotary member, an attachment element joined to said impulse arm, and torsion elements between said anchor and attachment elements, said mounting device permitting oscillation of said impulse arm to move said reaction means in the path of said water stream; and an impact receiving means on said rotary member periodically engageable by said impulse arm to cause turning of said rotary member in increments.

References Cited in the file of this patent

UNITED STATES PATENTS

| | | |
|---|---|---|
| 2,066,187 | Piron | Dec. 29, 1936 |
| 2,310,796 | Lappin | Feb. 9, 1943 |
| 2,315,844 | Terrando | Apr. 6, 1943 |
| 2,625,411 | Unger | Jan. 13, 1953 |
| 2,681,250 | Metcalf | June 15, 1954 |
| 2,801,133 | Ridley | July 30, 1957 |

FOREIGN PATENTS

| | | |
|---|---|---|
| 634,331 | Great Britain | Mar. 15, 1950 |